United States Patent
Hultell et al.

(10) Patent No.: US 9,042,344 B2
(45) Date of Patent: May 26, 2015

(54) BASE STATION, USER EQUIPMENT, RADIO NETWORK CONTROLLER AND METHODS THEREIN

(71) Applicant: Telefonaktiebolaget L M Ericsson (publ), Stockholm (SE)

(72) Inventors: Johan Hultell, Solna (SE); Peter von Wrycza, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 181 days.

(21) Appl. No.: 13/703,460

(22) PCT Filed: Nov. 8, 2012

(86) PCT No.: PCT/SE2012/051217
§ 371 (c)(1),
(2) Date: Dec. 11, 2012

(87) PCT Pub. No.: WO2013/070161
PCT Pub. Date: May 16, 2013

(65) Prior Publication Data
US 2014/0064248 A1 Mar. 6, 2014

Related U.S. Application Data

(60) Provisional application No. 61/557,797, filed on Nov. 9, 2011.

(51) Int. Cl.
*H04W 52/24* (2009.01)
*H04W 52/40* (2009.01)
(Continued)

(52) U.S. Cl.
CPC .......... *H04W 52/241* (2013.01); *H04W 52/146* (2013.01); *H04W 52/16* (2013.01); *H04W 52/286* (2013.01); *H04W 52/40* (2013.01)

(58) Field of Classification Search
USPC ................. 370/318; 455/13.4, 522, 127.1
See application file for complete search history.

(56) References Cited

U.S. PATENT DOCUMENTS

| | | | |
|---|---|---|---|
| 2008/0069075 A1 * | 3/2008 | Holl | 370/342 |
| 2009/0129305 A1 | 5/2009 | Malkamaki | |
| 2010/0331035 A1 | 12/2010 | Bark et al. | |

FOREIGN PATENT DOCUMENTS

| | | |
|---|---|---|
| EP | 1341318 A2 | 9/2003 |
| KR | 20030017950 A | 3/2003 |
| WO | 02082666 A2 | 10/2002 |

OTHER PUBLICATIONS

Nokia, HSDPA Multiflow Data Transmission (RP-111084), 3GPP TSG RAN Meeting #53, Fukuoka, Japan, Sep. 13, 2011-Sep. 16, 2011, 6 pages.*

(Continued)

*Primary Examiner* — Hoon J Chung
(74) *Attorney, Agent, or Firm* — Coats & Bennett, PLLC

(57) ABSTRACT

Some embodiments herein relate to a method in a base station (12) for informing a user equipment (10) of a power offset to be used at the user equipment (10), which base station (12) is controlled by a radio network controller (15). The base station (12) evaluates a quality of a High Speed Dedicated Packet Control Channel, HS-DPCCH, from the user equipment (10). The base station (12) transmits information, which information is generated at the base station (12) and indicates a power offset to the user equipment (10). The power offset is based on the evaluation and to be used for a HS-DPCCH transmission from the user equipment (10).

28 Claims, 12 Drawing Sheets

(51) Int. Cl.
*H04W 52/14* (2009.01)
*H04W 52/16* (2009.01)
*H04W 52/28* (2009.01)

(56) References Cited

OTHER PUBLICATIONS

3rd Generation Partnership Project. "Open issues related to 8C-HSDPA." 3GPP TSG RAN WG1 Meeting #66, R1-112603, Aug. 22-26, 2011, Athens, Greece.

3rd Generation Partnership Project. "Ensuring HS-DPCCH quality for MF-HSDPA transmissions." 3GPP TSG RAN WG1 Meeting #67, Nov. 14-18, 2011, San Francisco, USA.

3rd Generation Partnership Project, "Physical layer procedures (FDD)", Technical Specification Group Radio Access Network; 3GPP TS 25.214 V10.4.0 (Sep. 2011), (Release 10).

3rd Generation Partnership Project, "Spreading and modulation (FDD)", Technical Specification Group Radio Access Network; 3GPP TS 25.213 V10.0.0 (Sep. 2010), (Release 10).

Interdigital Communications, LLC, "HS-DPCCH design considerations for HSDPA MF-TX," 3GPP TSG-RAN WG1 Meeting #67, Nov. 14-18, 2011, San Francisco, US, R1-114174.

PCT International Search Report dated Jan. 16, 2013 for corresponding PCT Application PCT/SE2012/051217 filed Nov. 8, 2012.

Qualcomm Inc; Orange; Nokia Siemens Networks; Ericsson; ST-Ericsson; T-Mobile USA; Alcatel-Lucent; Huawei, 'HSDPA Multiflow Data Transmission', RP-111375, Sep. 13, 2011.

\* cited by examiner

BASE STATION, USER EQUIPMENT, RADIO NETWORK CONTROLLER AND METHODS THEREIN

TECHNICAL FIELD

Embodiments herein relate to a base station, a user equipment, a Radio Network Controller and methods therein. In particular, embodiments herein relate informing the user equipment of a power offset.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations.

In a typical cellular radio system, also known as radio communications network, wireless terminals, also known as mobile stations and/or user equipments (UEs), communicate via a radio access network (RAN) to one or more core networks. The RAN covers a geographical area which is divided into cell areas, with each cell area being served by a base station, e.g. a radio base station (RBS), which in some networks may also be called, for example, a "NodeB" for WCDMA or "eNodeB" for LTE. A cell is a geographical area where radio coverage is provided by the radio base station equipment at a base station site. The cell definition may also incorporate frequency bands used for transmissions, which means that two different cells may cover the same geographical area but using different frequency bands. Each cell is identified by an identity within the local radio area, which is broadcast in the cell. Another identity identifying the cell uniquely in the whole mobile network is also broadcasted in the cell. The base stations communicate over the air or radio interface operating on radio frequencies with the user equipments within range of the base stations. The user equipments transmit data over the radio interface to the radio base stations in uplink (UL) transmissions and the radio base stations transmit data over an air or radio interface to the user equipments in downlink (DL) transmissions.

In some versions of the RAN, several base stations are typically connected, e.g. by landlines or microwave, to a controller node, such as a Radio Network Controller (RNC) or a Base Station Controller (BSC), which supervises and coordinates various activities of the plural base stations connected thereto. The RNCs are typically connected to one or more core networks.

Multi-Carrier (MC) High Speed Downlink Packet Access (HSDPA) transmission was standardized in 3rd Generation Partnership Project (3GPP) Releases (Rel)-8/9/10/11. This allows a wireless User Equipment (UE) to simultaneously receive data transmissions from multiple cells that belong to the same sector, same sector meaning same geographical area. This allows the use of one High Speed-Dedicated Physical Control Channel (HS-DPCCH) carrying the Hybrid Automatic Repeat Request Acknowledgement (HARQ-ACK) and Pre-Coding Information/Channel Quality Indicator (PCI/CQI) feedback for all cells, without compromising the HARQ-ARQ time budget for the base station or user equipment.

At a RAN#53 plenary of 3GPP, a work item on Multi-Flow (MF) HSDPA was initiated, as detailed in document RP-111375, "HSDPA Multiflow Data Transmissions," the disclosure of which is incorporated by reference herein in its entirety. MF-HSDPA transmissions allow a user equipment to receive data from different, potentially uncoordinated, cells. Further, an agreement was made that MF-HSDPA transmission will be supported in combination with 2×2 Multiple Input Multiple Output (MIMO).

FIG. 1 depicts a situation where a user equipment is in soft handover with two or more base stations and the uplink of the user equipment is power controlled by the strongest base station. In FIG. 1, the two base stations are a macro base station and a low-power base station, such as one implemented in a traffic hotspot. For MF-HSDPA scenarios, where both base stations schedule downlink transmissions to the user equipment, it is important that all base stations from which downlink transmission occurs can receive the feedback channel, e.g. HS-DPCCH, carrying the HARQ-ACK and PCI/CQI information related to the downlink cells.

In the 3GPP specifications, as well as in practice, there exist several classes of base stations, e.g. macro, micro, etc., which may be characterized by their transmit power, as well as other parameters. One scenario where such different base stations co-exist is when a macro layer, i.e. coverage from macro base station, is complemented by a small-power base station in a traffic hotspot. In order to benefit from MF-HSDPA transmissions, the received signal power from all participating base stations must be on par with each other. In FIG. 1, a user equipment is in a soft handover region of a macro and a small-power base station. An optimal position for UL handover is marked and an optimal position for DL handover is also marked. For this type of deployment, the strongest downlink base station is not necessarily the best base station from an uplink perspective. Furthermore, if a serving cell change is based on downlink Ec/Io or Received Signal Code Power (RSCP), then there can be a considerable uplink imbalance between the two base stations.

Table 1 depicts the quantized gain factors supported up until 3GPP Rel-10:

TABLE 1

Summary of the list of supported gain factors for HS-DPCCH physical channel

| Signaled values for $\Delta_{ACK}$, $\Delta_{NACK}$ and $\Delta_{CQI}$ | Quantized amplitude ratios $A_{hs} = \beta_{hs}/\beta_c$ | Difference in Tx power between adjacent signaled Δ values |
|---|---|---|
| 10 | 48/15 | 2.03 |
| 9 | 38/15 | 2.05 |
| 8 | 30/15 | 1.94 |
| 7 | 24/15 | 2.03 |
| 6 | 19/15 | 2.05 |
| 5 | 15/15 | 1.94 |
| 4 | 12/15 | 2.5 |
| 3 | 9/15 | 1.02 |
| 2 | 8/15 | 2.5 |
| 1 | 6/15 | 1.58 |
| 0 | 5/15 | — |

It should be noted that the network can only signal values between 0 and 8 via the Radio Resource Control (RRC) signaling, i.e. from the RNC. The offset corresponding to value 9 or 10 is used by the user equipment for certain MC-HSPA and MIMO configurations. The suitable power offsets $\Delta_{ACK}$, $\Delta_{NACK}$ and $\Delta_{CQI}$ for MF-HSDPA will be implementation-specific and the link imbalance that could be handled by the existing signaling, as a function of the signaled Δ-values, is shown in FIG. 2. Δ-values are defined along a horizontal axis and maximum asymmetry in dB is defined along a vertical axis. From this FIG. 2, it is shown that if the same power is used for DPCCH and HS-DPCCH, i.e. Δ=5, a total link imbalance, accounting both for the difference in fast fading and the differences in path loss, of 6 dB could be handled by adapting the power offsets used for the HS-DPCCH transmissions. However, it is questionable whether the existing power offsets are sufficient to ensure an acceptable HS-DPCCH quality when the user equipment is in a Soft Hand-Over (SHO) region between a macro and a small-power base station. Furthermore, in current specifications, the reconfiguration would need to be based on RRC reconfiguration controlled by the RNC. This means that the serving base station would have to: Identify that the HS-DPCCH quality is inferior; Signal to the RNC that the HS-DPCCH quality is inferior; and the RNC would need to re-configure the power offsets used by the user equipment.

These steps are associated with significant delays, e.g. ~several 100s of ms, and the RRC reconfiguration would furthermore be sent to a user equipment in poor coverage, at least for the HS-DPCCH, since this is what triggered the reconfiguration in the first place. Hence, the transmissions of these RRC reconfigurations would be associated with low quality.

SUMMARY

An object of embodiments herein is to improve the performance of the radio communications network.

According to an aspect of embodiments herein, the object is achieved by a method in a base station for informing a user equipment of a power offset to be used at the user equipment. The base station is controlled by a radio network controller. The base station evaluates a quality of an HS-DPCCH from the user equipment. The base station then transmits to the user equipment, information. The information is generated at the base station and indicates a power offset. The power offset is based on the evaluation and to be used for a HS-DPCCH transmission from the user equipment.

According to another aspect of embodiments herein, the object is achieved by a method in a user equipment for transmitting a HS-DPCCH signal to one or more base stations. The user equipment receives, from a base station, information generated at the base station, and indicating a power offset. The power offset is to be used for a HS-DPCCH transmission from the user equipment. The user equipment then transmits the HS-DPCCH signal using a power, which power is based on the information indicating the power offset.

According to yet another aspect of embodiments herein, the object is achieved by a base station for informing a user equipment of a power offset to be used at the user equipment. The base station is configured to be controlled by a radio network controller. The base station comprises an evaluating circuit configured to evaluate a quality of an HS-DPCCH from the user equipment. The base station comprises a transmitter configured to transmit information to the user equipment, which information is generated at the base station and indicates a power offset. The power offset is based on the evaluation and to be used for a HS-DPCCH transmission from the user equipment.

According to still another aspect of embodiments herein, the object is achieved by a user equipment for transmitting a HS-DPCCH signal to one or more base stations. The user equipment comprises a receiver configured to receive from a base station information generated at the base station. The information indicates a power offset, which power offset is to be used for a HS-DPCCH transmission from the user equipment. The user equipment also comprises a transmitter configured to transmit the HS-DPCCH signal using a power, which power is based on the information indicating the power offset.

According to an additional aspect of embodiments herein, the object is achieved by a method in a radio network controller for informing a user equipment of a power offset to be used at the user equipment. The user equipment is in a Soft Hand-Over region between base stations of different transmit power. The radio network controller controls the base stations. The radio network controller transmits to the user equipment, a value indicating a power offset, which value is one of at least ten values for handling power imbalances between the base stations.

According to yet an additional aspect of embodiments herein, the object is achieved by a radio network controller for informing a user equipment of a power offset to be used at the user equipment. The user equipment is in a Soft Hand-Over region between base stations of different transmit power. The radio network controller is configured to control the base stations and comprises a transmitting circuit configured to transmit to the user equipment, a value indicating a power offset, which value is one of at least ten values for handling power imbalances between the base stations.

Since the base station generates and transmits the indication to the user equipment, the user equipment may quick and swiftly use the power offset leading to an improved performance of the radio communications network.

DETAILED DESCRIPTION

Figure 1:
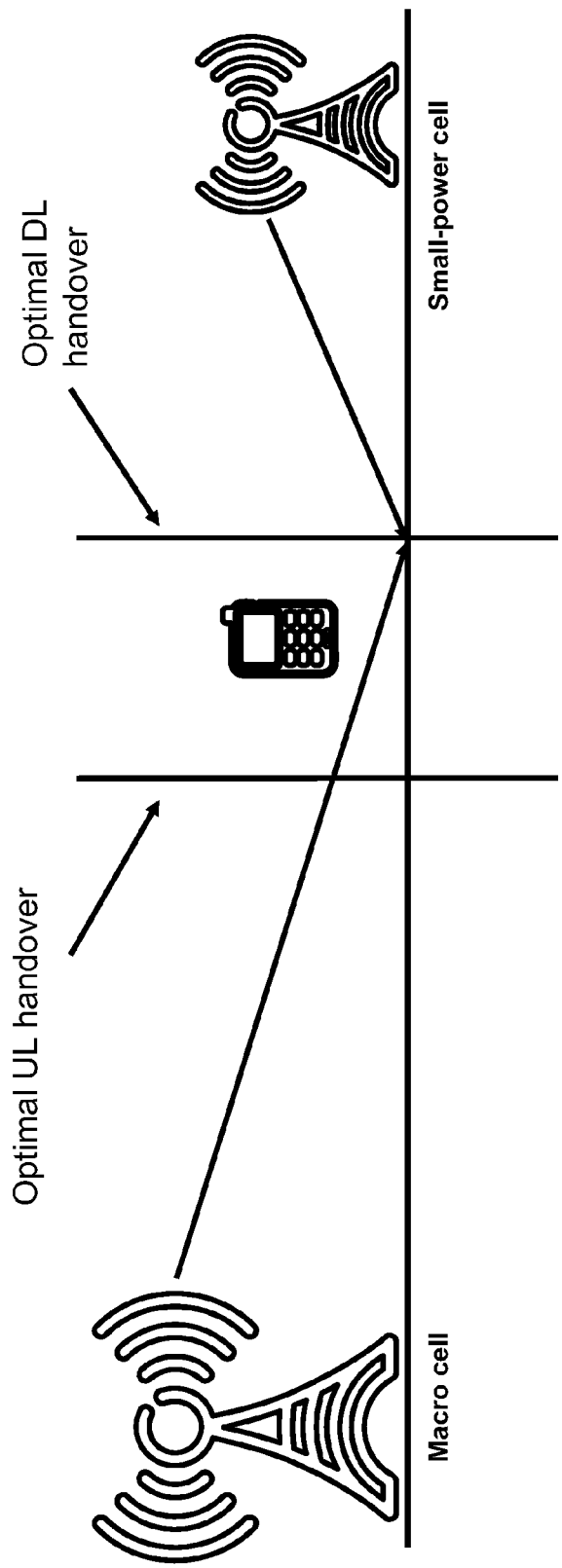
FIG. 1 is a functional block diagram depicting a user equipment in soft handoff between a macro cell and a small-power cell.
Figure 2:
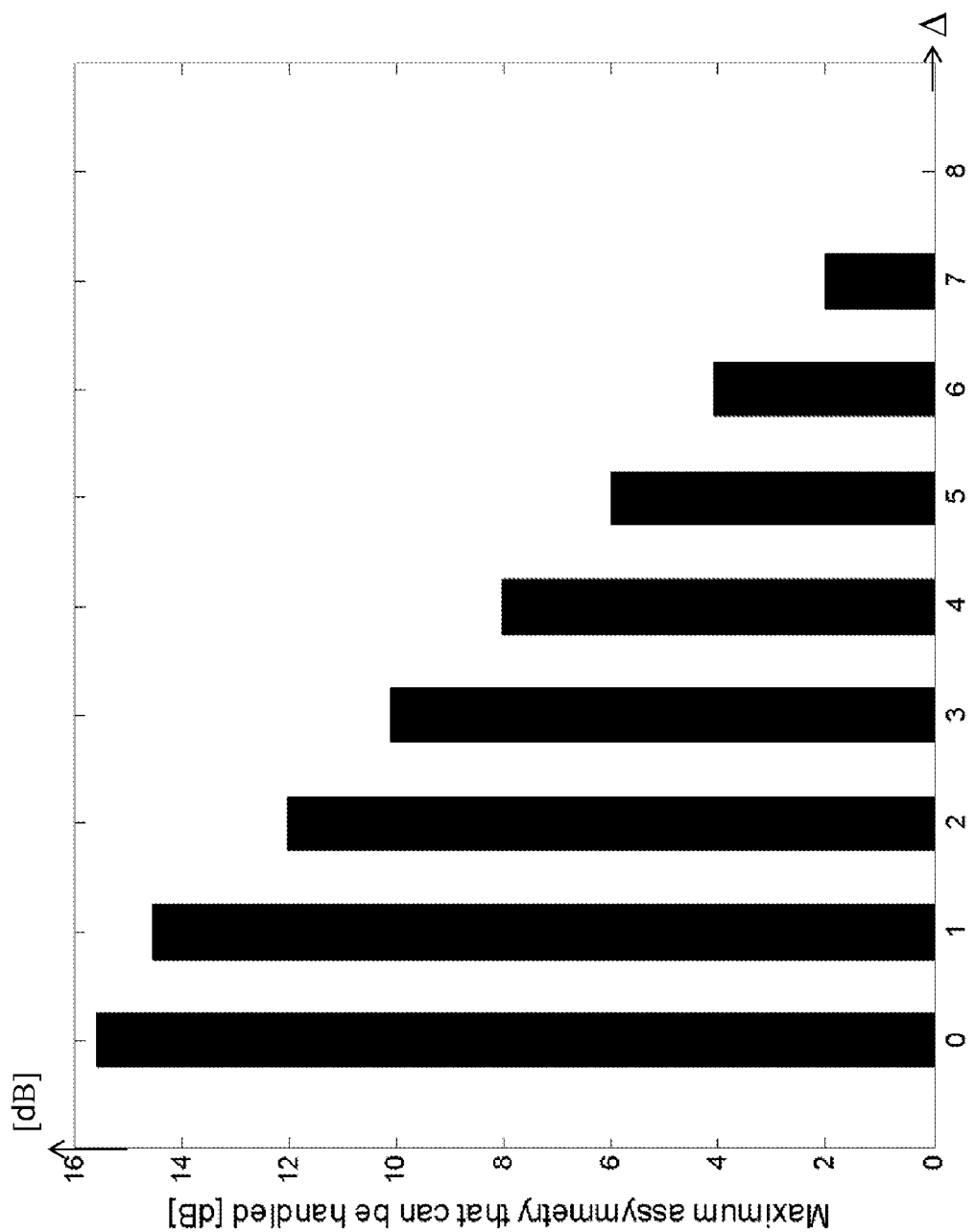
FIG. 2 is a graph depicting the maximum uplink asymmetry that can be handled given a signaled (and used) power offset for a balanced scenario.
Figure 3:
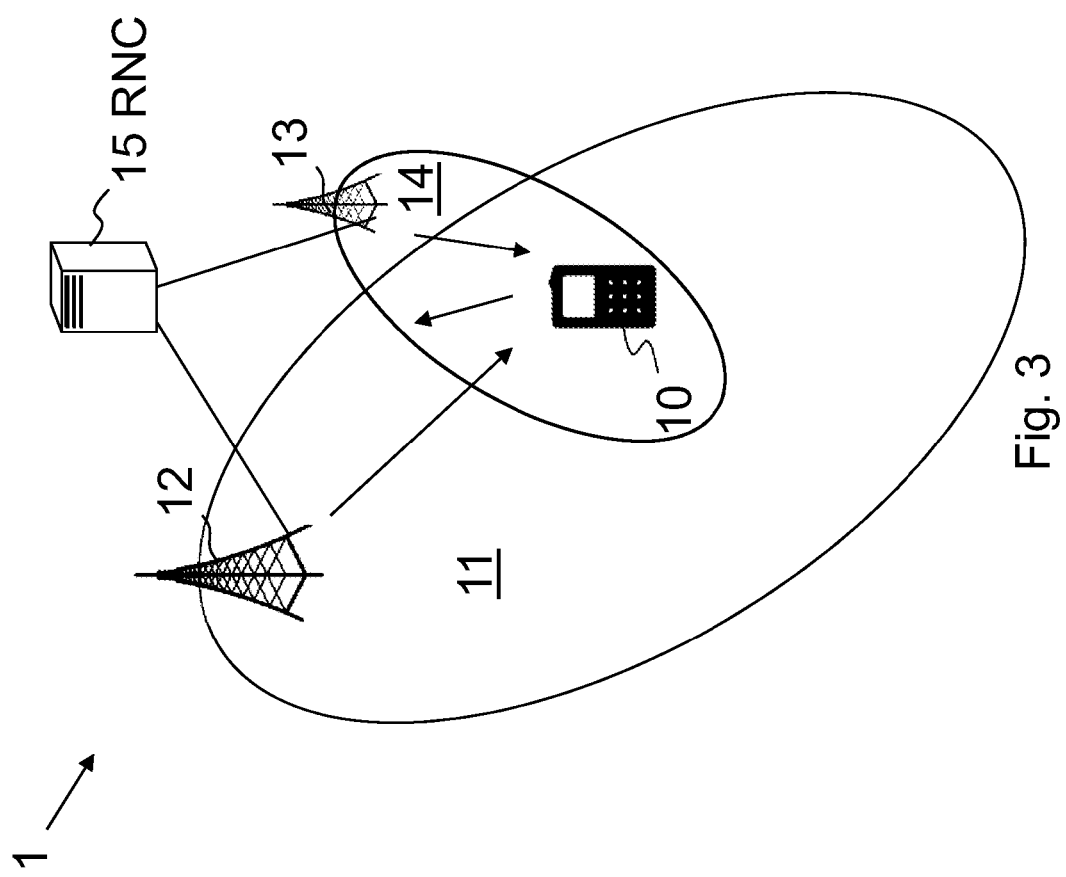
FIG. 3 is a schematic overview of a radio communications network according to embodiments herein.

FIG. 3 is a schematic overview depicting a radio communications network 1 according to embodiments herein. The technology used in the radio communications network 1 may, e.g. be LTE, LTE-Advanced, WCDMA, GSM/EDGE, WiMax, or UMB, just to mention a few possible implementations. In the radio communications network 1 a user equipment 10 communicates via a RAN to one or more core networks. The user equipment 10 communicates via a base station 12, which base station 12 provides radio coverage over at least one respective geographical area forming a cell 11. The base station 12 may in some networks also be called, for example, radio base station, a "NodeB" in WCDMA also called Universal Mobile Telecommunications System (UMTS) or "eNodeB" in LTE. Each cell is identified by an identity within the local radio area, which is broadcast to user equipments in the cell. Another identity identifying the cell uniquely in the whole radio communications network 1 is also broadcasted in the cell. The user equipment 10 transmits data over a radio interface to the base station 12 in uplink (UL) transmissions and the base station 12 transmit data to the user equipment 10 in downlink (DL) transmissions. The base stations communicate over the air interface operating on radio frequencies with the user equipments within range of the base stations. The user equipment 10 may be in a soft handover situation to a second base station 13 providing coverage over a second cell 14. The user equipment 10 may receive MF-HSDPA transmissions from each base station and the received signal power from all participating base stations is on par with each other. The user equipment 10 then signals feedback over a single UL, a HS-DPCCH, to the base stations 12,13.

In some versions of the RAN, several base stations are typically connected, e.g., by landlines or microwave, to a controller node, such as a RNC 15 or a Base Station Controller (BSC), which supervises and coordinates various activities of the plural base stations connected thereto. The RNC 15 is typically connected to one or more core networks. In general, in Evolved Universal Terrestrial Radio Access Network (E-UTRAN), also known as the LTE radio access E-UTRAN/LTE the functions of an RNC are distributed between the radio base stations and the core network. As such, the RAN of an Evolved Packet System, EPS, i.e. an LTE system, has an essentially "flat" architecture comprising radio base stations without reporting to an RNC. However, embodiments herein relate to an architecture having a controller node such as the radio network controller 15. Embodiments herein disclose that the base station 12 transmits information to the user equipment 10 indicating a power offset. The power offset being based on an evaluation of a quality of HS-DPCCH received from the user equipment 10 and the information is generated at the base station 12. Embodiments herein lead to an improved HS-DPCCH reception by efficient control of the user equipment 10. According to embodiments herein, the received HS-DPCCH quality is improved by introducing the possibility for base stations that dynamically schedule downlink data to the user equipment 10, i.e., without involving the RNC, to change the power offsets $\Delta_{ACK}$, $\Delta_{NACK}$ and $\Delta_{CQI}$ that are used by the user equipment 10 for transmitting the HS-DPCCH physical channel. This is signalled to the user equipment 10 by means of e.g. Layer one (L1) signaling, such as sending High Speed Shared Control Channel (HS-SCCH) orders. In some embodiments, the base station 12 may only send commands to the user equipment 10 requesting it to increase the power offsets, also referred to herein as HS-DPCCH power offsets, by means of HS-SCCH orders. In another embodiment, the base station 12 may send commands to the user equipment 10 requesting it to either increase or decrease the HS-DPCCH power offset/s. Thus, the user equipment 10 quickly and swiftly responds to an adjustment of the power offset leading to an improved performance of the radio communications network 1.

Figure 4:
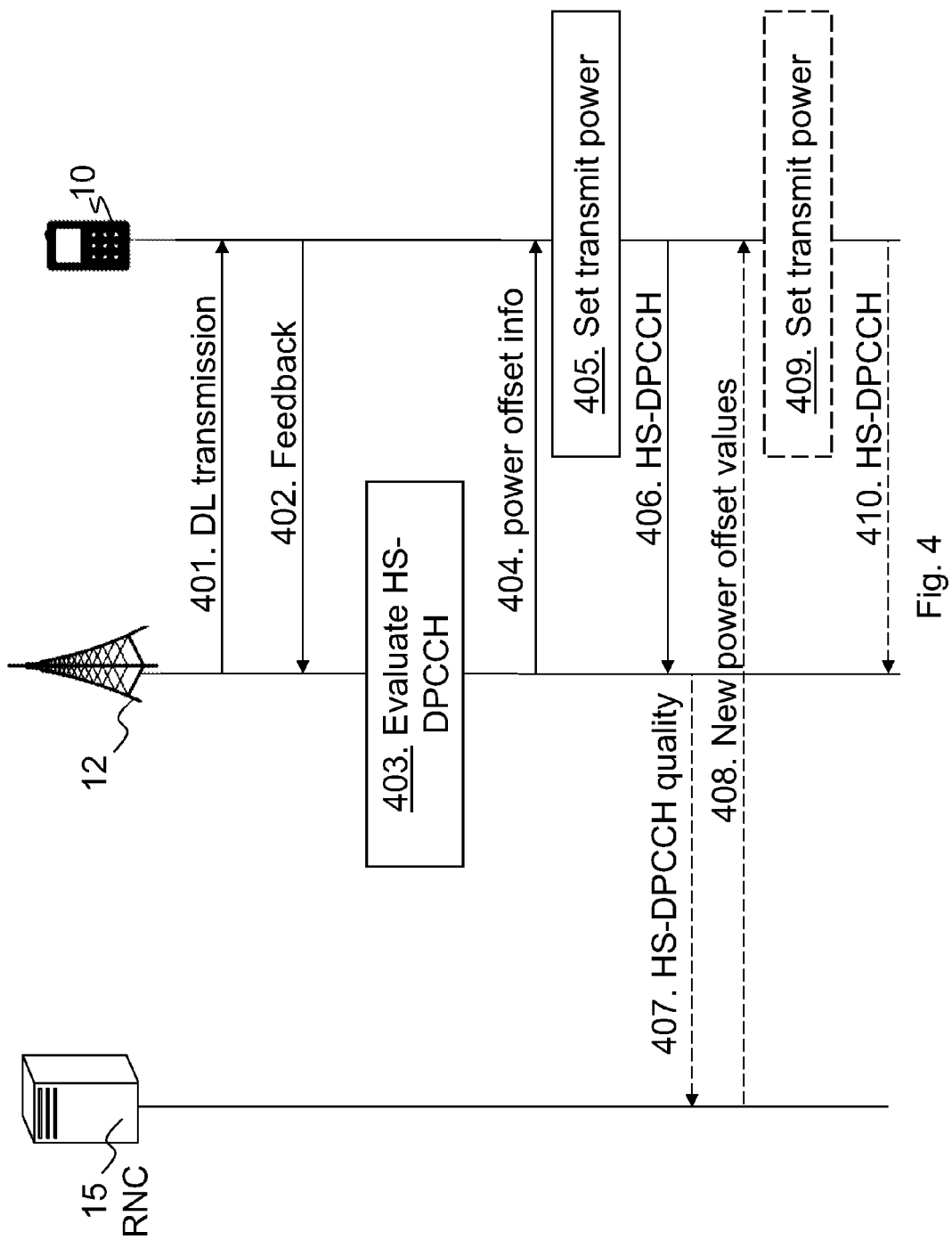
FIG. 4 is a schematic combined flowchart and signaling scheme according to embodiments herein.

FIG. 4 is a combined flowchart and signaling scheme according to embodiments herein.

Action 401. The base station 12 may transmit data in a DL transmission towards the user equipment 10. The user equipment 10 may be in a SHO region between the base station 12 and the second base station 13.

Action 402. The user equipment 10 may then transmit feedback to the base station 12, in an UL HS-DPCCH, which feedback indicates quality of the DL transmission.

Action 403. The base station 12, according to embodiments herein, evaluates the HS-DPCCH performance and signals to the user equipment 10 if the value of the one or more power offsets, e.g. $\Delta_{ACK}$, $\Delta_{NACK}$ and/or $\Delta_{CQI}$, need to be increased. Examples of ways in which the base station 12 may evaluate the quality of the HS-DPCCH comprise: Evaluate the SIR error of the DPCCH. A large SIR error is an indication of that the HS-DPCCH is inferior; Evaluate the DPCCH SIR level. A low DPCCH SIR level is an indication of that the HS-DPCCH may be inferior; Evaluate the fraction of uplink packets that it successfully receives from the user equipment 10. This is known since the base station 12 will send an ACK/NACK on an Enhanced Dedicated Channel (E-DCH) HARQ Acknowledgement Indicator Channel (E-HICH) to the user equipment 10 depending on whether the base station 12 could successfully decode the packet or not. The base station 12 may further know whether the packet has been successfully received by another base station, e.g. the second base station, from the E-DCH-DPCCH, which conveys information about whether a packet is a retransmission or not. If the base station 12 only decodes a small fraction of the uplink packets then this is an indication of that the DPCCH, and thus also HS-DPCCH, quality is inferior at the base station 12; Evaluate the HARQ misdetection probability. A high HARQ-ACK misdetection probability implies that the HS-DPCCH quality is poor; Evaluate whether the downlink Block Error Rate (BLER) for the packets transmitted in downlink is higher than BLER level that the base station 12 expects. A too high BLER level may be an indication of that the PCI/CQI information is not successfully received; Evaluate the fraction of Transmit Power Control (TPC) UP commands, indicating an adjustment of the transmit power, that the base station 12 transmits to the user equipment 10. If the base station 12 transmits TPC command UP in more than x percent of the time this could be viewed as indication of poor uplink quality. The quality assessment methods listed above are not exclusive or exhaustive. Furthermore, one or more of these methods maybe combined into a quality metric.

Action 404. Given a quality criterion used at the base station 12, the base station 12 will, if the measured quality is e.g. below a first threshold, send an L1 message to the user equipment 10 directing the user equipment 10 to increase the power offset or offsets, $\Delta_{ACK}$, $\Delta N_{NACK}$ and $\Delta_{CQI}$. Similarly, if the quality is e.g. above a second threshold, which may be the same or different than the first threshold, the base station 12 may direct the user equipment 10 to reduce the power offset used for HS-DPCCH transmissions.

In different embodiments, the L1 message generated and sent from the base station 12 to the user equipment 10 may be either relative or absolute. That is, it may indicate that the user equipment 10 should increase or decrease the power offset, using the power offset currently used by the user equipment 10 as reference. I.e. a HS-SCCH order may indicate that the user equipment 10 should increase the "signaled value" from 4 to 5, given that the user equipment 10 currently uses power offset 4, or the HS-SCCH order could explicitly indicate which power offset that the user equipment 10 should use. The HS-SCCH informs the user equipment 10 that data will be sent on the High Speed Downlink Shared Channel (HS-DSCH), e.g. 2 slots ahead. The Uplink HS-DPCCH carries acknowledgment information and current CQI of the user equipment 10. This CQI is then used by the base station 12 to calculate how much data to send to the user equipment 10 on the next transmission.

In some embodiments, to avoid ping-pong effects between base stations, the base station 12 is only allowed to increase the HS-DPCCH power offset with HS-SCCH orders. Ping-pong effect means herein that the user equipment 10 is handed over back and forth between the base stations 12,13. In these embodiments, it is not possible to ask the user equipment 10 to reduce the HS-DPCCH power offset using HS-SCCH orders. In some embodiments, the base station 12 may direct the user equipment 10 to increase or decrease the HS-DPCCH power offset using HS-SCCH orders. In these embodiments, reductions in the power offsets require RRC reconfigurations.

Action 405. The user equipment 10 may then set the transmit power using the power offset. Thus, the user equipment 10 receives the information e.g. the HS-SCCH order, and adjusts, if needed, the transmit power accordingly. In some embodiments, a specific ACK codeword are introduced to acknowledge reception of HS-SCCH orders, and request an increased/decreased power offset. This allows base stations other than the one that sent the HS-SCCH order, i.e. the base station 12, to be made aware that the power offset used for HS-DPCCH has been changed. This is not the case with current HARQ-ACK coding, since the user equipment 10 ACKs the reception of the HS-SCCH order with the same HARQ-ACK codeword that is used to acknowledge a data transmission.

Action 406. The user equipment 10 transmit the HS-DPCCH signal with the transmit power.

In some embodiments the range of gain factors are increased leading to 10 or more values of power offsets to be selected and transmitted to the user equipment 10. A benefit of increasing a range of gain factors, from 9 values to 11 values, used for HS-DPCCH transmissions is that larger imbalances may be supported. Furthermore, by changing the power offsets by means of HS-SCCH orders, the load on the RNC 15 is reduced. This also reduces delays associated with having the base station 12 signalling the RNC 15 that the HS-DPCCH performance is too poor, and having the RNC 15 signalling the new power offsets to the user equipment 10 and base station 12 being an alternative solution.

However in some alternative embodiments the RNC transmits the increased range of gain factors, from 9 values to 11 values, to the user equipment 10 as illustrated with the dashed lines in the FIG. 4.

Action 407. In some alternative embodiments as stated above, the base station 12 transmits information to the RNC 15, which information regards quality of HS-DPCCH from the user equipment 10.

Action 408. The RNC 15 may then transmit via the base station 12 to the user equipment 10 new power offset values to handle larger imbalances in e.g. a Heterogeneous Network (HetNet) scenario or similar. In these scenarios the transmit powers of base stations taking part in a handover differs over a threshold, i.e. the imbalance between the base stations are over a certain level which may lead to that the RNC 15 must send power offset values of larger values such as index 9 or 10.

Action 409. The user equipment 10 may then set the transmit power using the power offset. Thus, the user equipment 10 receives the information and adjusts, if needed, the transmit power accordingly.

Action 410. The user equipment 10 transmit the HS-DPCCH signal with the transmit power.

Figure 5:
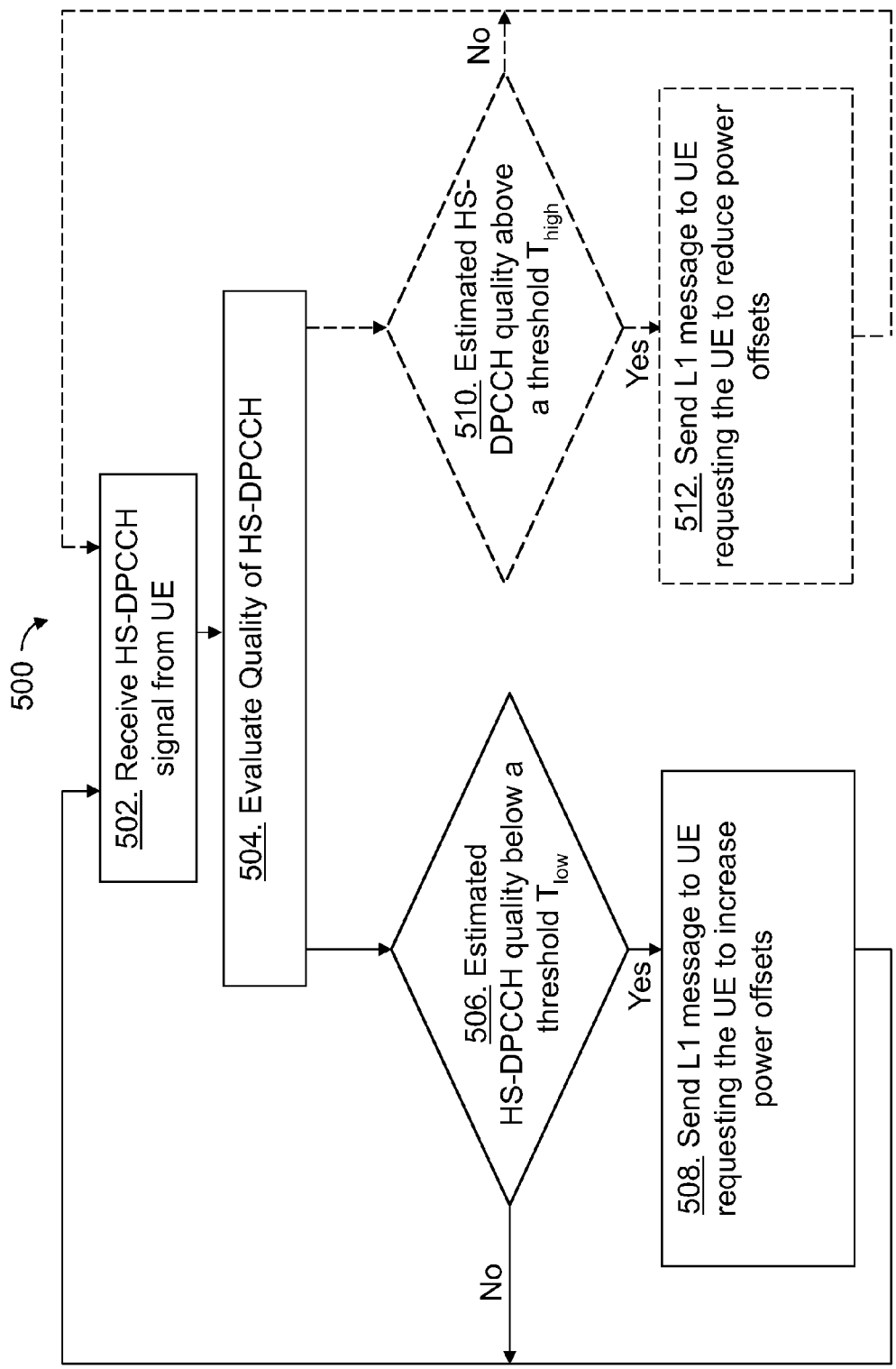
FIG. 5 is a flow diagram depicting a method of dynamic HS-DPCCH power offset adjustment executed at a base station.

FIG. 5 depicts a method 500 of HS-DPCCH power offset control at the base station 12. The base station 12 receives a HS-DPCCH signal from the user equipment 10 (block 502; Receive HS-DPCCH signal from the user equipment 10), the HS-DPCCH signal also transmitted to other base stations, e.g. second base station 13. The base station 12 evaluates the quality of the received HS-DPCCH (block 504; Evaluate Quality of HS-DPCCH), such as via any of the methods described hereinabove, or another appropriate method. If the HS-DPCCH quality is below a first predetermined threshold $T_{low}$ (block 506; Estimated HS-DPCCH quality below a threshold $T_{low}$), the base station 12 transmits an L1 message directly to the user equipment 10, including a command for the user equipment 10 to increase its HS-DPCCH power offset (block 508; Send L1 message to user equipment 10 requesting the user equipment 10 to increase power offsets). The L1 message may comprise an HS-SCCH order, and the HS-DPCCH power offset command may be relative to a current value, or an absolute value. In some embodiments, as indicated by dashed lines, the base station 12 additionally compares HS-DPCCH quality to a second predetermined threshold $T_{high}$ (block 510; Estimated HS-DPCCH quality above a threshold $T_{high}$), which may be the same as, or different from, the first predetermined threshold $T_{low}$. If the HS-DPCCH quality is above the second predetermined threshold $T_{high}$ (block 510), the base station 12 transmits an L1 message directly to the user equipment 10, including a command for the user equipment 10 to decrease its HS-DPCCH power offset (block 512; Send L1 message to user equipment requesting the user equipment to reduce power offsets). It should be understood that in case the thresholds are not passed or when the L1 message is sent, the method restarts.

Figure 6:
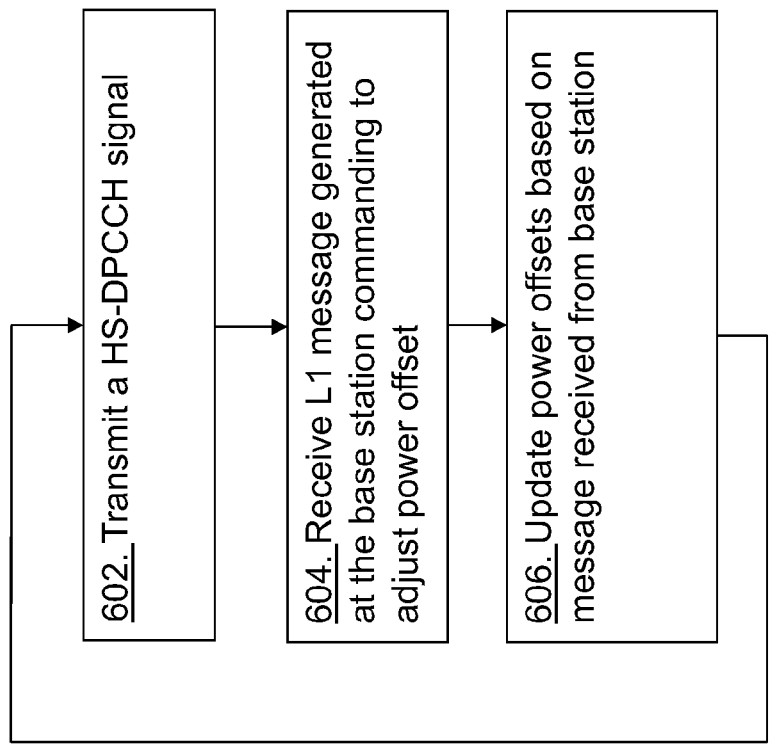
FIG. 6 is a flow diagram depicting a method of dynamic HS-DPCCH power offset adjustment executed at a user equipment.

FIG. 6 depicts a method 200 of HS-DPCCH power offset control at the user equipment 10. The user equipment 10 transmits a HS-DPCCH signal to two or more base stations 12,13 (block 602). In response to the received HS-DPCCH quality, the user equipment 10 receives from the base station 12 an L1 message, such as an HS-SCCH order, including a command to adjust, increase or decrease, the HS-DPCCH power offset (block 604). The L1 message is generated at the base station 12 and sent directly to the user equipment 10. That is, the HS-DPCCH power offset control command is not generated at a RNC. In response to the received HS-DPCCH power offset control command, the user equipment 10 adjusts its HS-DPCCH power offset (block 606). Thus, the user equipment 10 updates power offsets based on message received from base station. In one embodiment, the user equipment 10 responds with a HARQ-ACK encoding distinct from that used for data transmissions, which indicates that the HS-DPCCH power offset was adjusted (not shown in FIG. 6).

Embodiments herein improve the received HS-DPCCH quality in multi-flow (MF) HS-DPCCH environments, as well as user equipments in soft handover. They do not require any change of existing values of $\Delta_{ACK}$, $\Delta_{NACK}$ and $\Delta_{CQI}$ other than adding additional values. The embodiments are easily implementable in current HSDPA deployments. Since the HS-DPCCH carries the HARQ-ACK and PCI/CQI information related to the downlink cells, improved reception of this channel by the base stations will improve system performance.

Although embodiments have been described herein in the context of a MF-HSDPA scenario, the claimed solution is not limited to this context. As will be readily appreciated by those of skill in the art, given the teachings of the present disclosure, embodiments herein are readily applicable to scenarios where downlink transmissions only occur from one cell in the activate set, as per 3GPP Rel-5.

Figure 7:
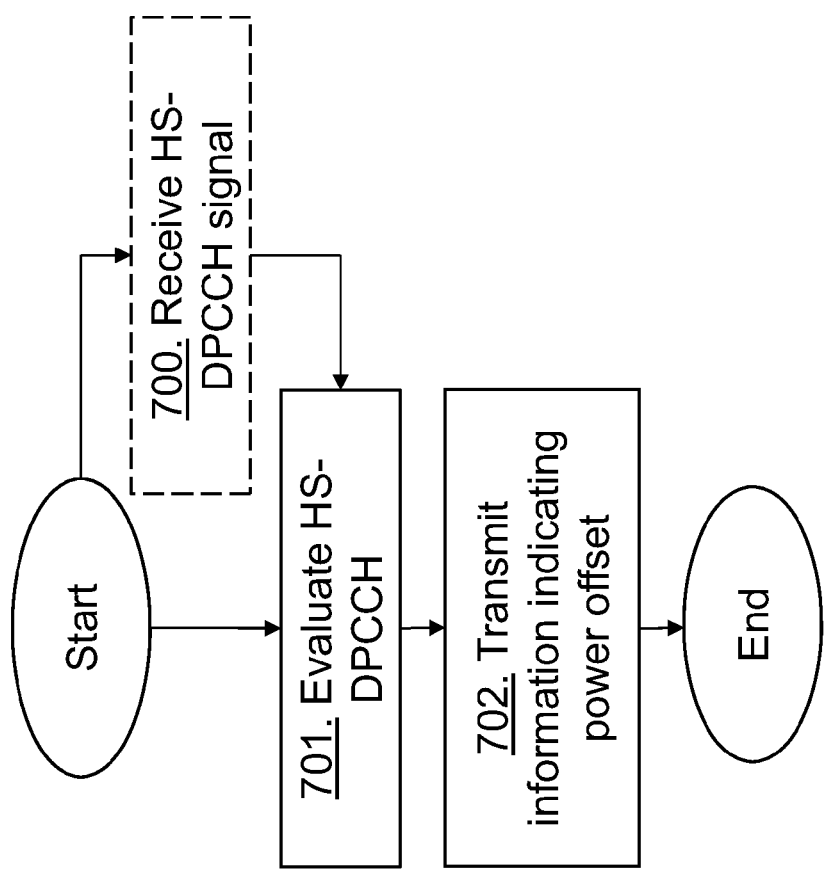
FIG. 7 is a flow diagram depicting a method in a base station according to embodiments herein.

The method actions in the base station 12, for informing the user equipment 10 of the power offset to be used at the user equipment 10. The base station 12 is controlled by the radio network controller 15, according to some general embodiments will now be described with reference to a flowchart depicted in FIG. 7. The actions do not have to be taken in the order stated below, but may be taken in any suitable order. Actions performed in some embodiments are marked with dashed boxes.

Action 700. The base station 12 may in some embodiments receive a HS-DPCCH signal from the user equipment 10.

Action 701. The base station 12 evaluates a quality of the HS-DPCCH from the user equipment 10. The base station 12 may compare evaluated quality of the HS-DPSSCH to a first or second threshold of HS-DPCCH quality.

Action 702. The base station 12 transmits to the user equipment 10, information indicating a power offset. The power offset is based on the evaluation and is to be used for a HS-DPCCH transmission from the user equipment 10. The information is generated at the base station 12 and may be comprised in a layer one, L1, message. The information may for example be comprised in a HS-SCCH order. In some embodiments the information indicating the power offset comprises a power offset value or an adjustment of a power offset value. The base station 12 may transmit directly to the user equipment 10 an increase or decrease of the power offset at the user equipment 10.

Some embodiments herein relate to a method, performed by a NodeB, of improving the quality of HS-DPCCH signals received from a user equipment transmitting the HS-DPCCH also to a different NodeB, comprising: evaluating the quality of HS-DPCCH received at the NodeB; comparing the evaluated HS-DPCCH quality to a first predetermined threshold; and if the evaluated HS-DPCCH quality is below the first predetermined threshold, transmitting directly to the user equipment a command to increase a HS-DPCCH power offset. The NodeB may transmit directly to the user equipment a command to increase a HS-DPCCH power offset comprises transmitting to the user equipment a L1 message including the command. The L1 message may comprise an HS-SCCH order. The HS-SCCH order may comprise an offset by which the user equipment should increase its HS-DPCCH power offset from a current value. The HS-SCCH order may comprise a HS-DPCCH power offset value to which the user equipment should set its HS-DPCCH power offset. The NodeB may compare the evaluated HS-DPCCH quality to a second predetermined threshold; and if the evaluated HS-DPCCH quality is above the second predetermined threshold, the NodeB may transmit directly to the user equipment a command to decrease the HS-DPCCH power offset. The NodeB may receive a HARQ-ACK from a UE; and may determine, from the codeword used by the user equipment to encode the HARQ-ACK, that another NodeB ordered the user equipment to alter its HS-DPCCH power offset. The evaluating of the quality of HS-DPCCH received at the NodeB may comprise evaluating the SIR error of the DPCCH. The evaluating of the quality of HS-DPCCH received at the NodeB may comprise evaluating the DPCCH SIR level. The evaluating of the quality of HS-DPCCH received at the NodeB may comprise evaluating the fraction of uplink packets that the NodeB successfully receives from the UE. The evaluating of the quality of HS-DPCCH received at the NodeB may comprise evaluating the HARQ misdetection probability. The evaluating of the quality of HS-DPCCH received at the NodeB may comprise evaluating whether the downlink BLER for packets transmitted to the user equipment is higher than an expected BLER level. The evaluating of the quality of HS-DPCCH received at the NodeB may comprise evaluating a fraction of TPC UP commands that the NodeB transmits to the UE.

Figure 8:
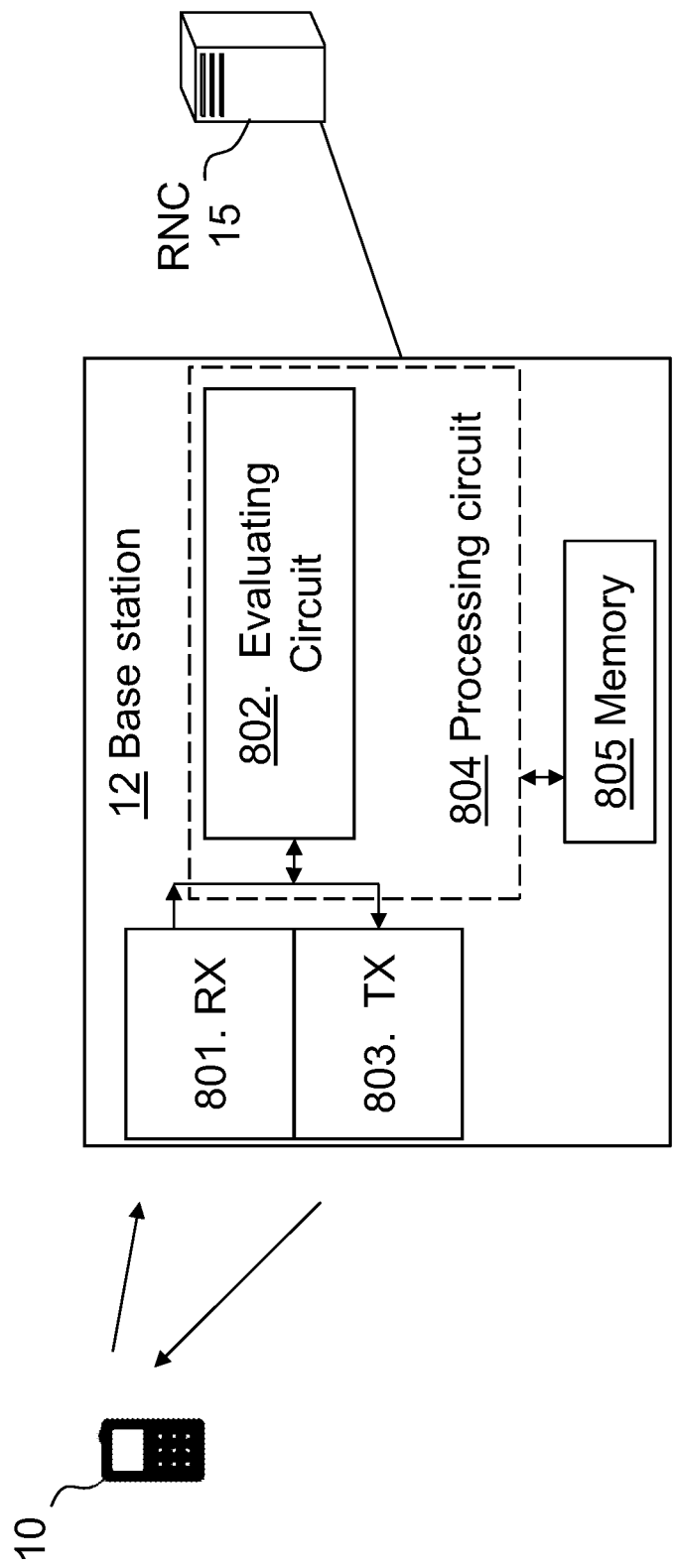
FIG. 8 is a block diagram depicting a base station according to embodiments herein.

FIG. 8 is a block diagram depicting the base station 12 according to embodiments herein for informing the user equipment 10 of the power offset to be used at the user equipment 10. The base station 12 is configured to be controlled by a radio network controller 15.

The base station 12 comprises a receiver 801 that may be configured to receive a HS-DPCCH from the user equipment 10.

The base station 12 comprises an evaluating circuit 802 configured to evaluate a quality of the HS-DPCCH from the user equipment 10. The evaluating circuit may be configured to compare evaluated quality of the HS-DPSSCH to a first or a second threshold of HS-DPCCH quality.

The base station 12 further comprises a transmitter 803 configured to transmit to the user equipment 10, information indicating a power offset. The base station 12 generates the information. The power offset is based on the evaluation and to be used for a HS-DPCCH transmission from the user equipment 10. The information may be comprised in a L1 message. The information may be comprised in an HS-SCCH order. The information indicating the power offset comprises a power offset value or an adjustment of a power offset value. The transmitter 803 may be configured to transmit directly to the user equipment 10 an increase or decrease of the power offset at the user equipment 10. Thus, the base station 12 may be operative to receive HS-DPCCH signals from the user equipment 10 and further operative to transmit L1 signaling to the user equipment 10.

The embodiments herein for informing the user equipment 10 of the power offset to be used at the user equipment 10 may be implemented through one or more processors, such as a processing circuit 804 in the base station 12 depicted in FIG. 8, together with computer program code for performing the functions and/or method steps of the embodiments herein. The program code mentioned above may also be provided as a computer program product, for instance in the form of a data carrier carrying computer program code for performing embodiments herein when being loaded into the base station 12. One such carrier may be in the form of a CD ROM disc. It is however feasible with other data carriers such as a memory stick. The computer program code may furthermore be provided as pure program code on a server and downloaded to the base station 12.

Furthermore, the base station 12 comprises a memory 805 that may be configured to be used to store data on such as thresholds, quality estimates, power offsets, index table of power offsets, application to perform the methods herein when being executed on the base station 12, and/or similar. The memory 805 may comprise one or more memory units.

Some embodiments herein relate to a NodeB in WCDMA operative to receive HS-DPCCH signals from a user equipment transmitting the HS-DPCCH also to a different NodeB, comprising a transceiver, such as the receiver 801 and the transmitter 803, operative to receive HS-DPCCH signals from the user equipment and further operative to transmit L1 signaling to the UE. The NodeB comprises a controller, such as the processing circuit 804, operative to evaluate the quality of HS-DPCCH received at the NodeB; and to compare the evaluated HS-DPCCH quality to a first predetermined threshold; and if the evaluated HS-DPCCH quality is below the first predetermined threshold, cause the transceiver to transmit directly to the user equipment a command to increase a HS-DPCCH power offset. The controller may be operative to transmit directly to the user equipment a command to increase a HS-DPCCH power offset by transmitting to the user equipment a L1 message including the command. The L1 message may comprise an HS-SCCH order. The HS-SCCH order may comprise an offset by which the user equipment should increase its HS-DPCCH power offset from a current value. The HS-SCCH order may comprise a HS-DPCCH power offset value to which the user equipment should set its HS-DPCCH power offset. The controller may further be operative to compare the evaluated HS-DPCCH quality to a second predetermined threshold; and, if the evaluated HS-DPCCH quality is above the second predetermined threshold, to transmit directly to the user equipment a command to decrease the HS-DPCCH power offset. The transceiver may further be operative to receive a HARQ-ACK from a UE; and the controller may further be operative to determine, from the codeword used by the user equipment to encode the HARQ-ACK, that another NodeB ordered the user equipment to alter its HS-DPCCH power offset.

Figure 9:
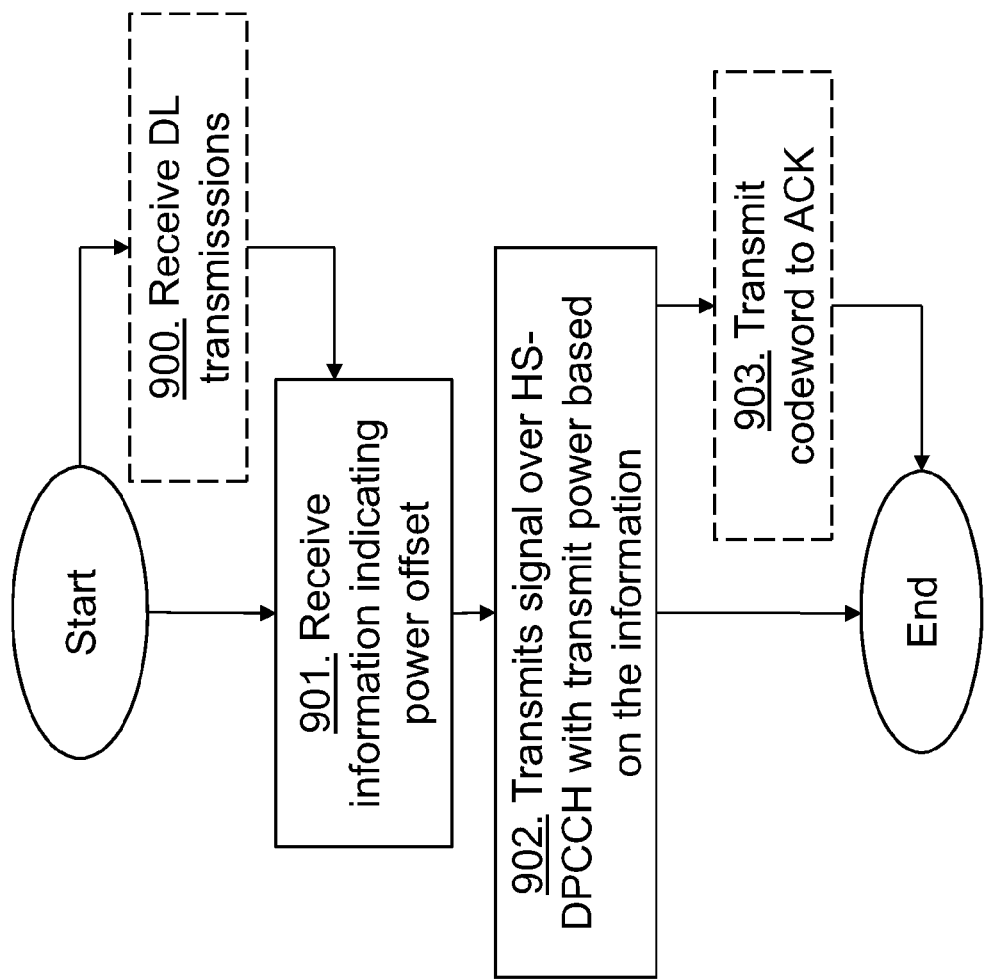
FIG. 9 is a flow diagram depicting a method in a user equipment according to embodiments herein.

The method actions in the user equipment 10 for transmitting a HS-DPCCH signal to one or more base stations according to some general embodiments will now be described with reference to a flowchart depicted in FIG. 9. The actions do not have to be taken in the order stated below, but may be taken in any suitable order. Actions performed in some embodiments are indicated by dashed boxes.

Action 900. The user equipment 10 may receive a first downlink transmission from the base station 12 and a second downlink transmission from the second base station 13. A HS-DPCCH signal indicates feedback of the received downlink transmissions. Thus, the user equipment 10 may receive data transmissions from the base stations 12,13 according to MF-HSDPA.

Action 901. The user equipment 10 receives, from the base station 12, information. The information is generated at the base station 12, and indicates a power offset. The power offset is to be used for a HS-DPCCH transmission from the user equipment 10. The information may be comprised in a L1 message. The information may be comprised in a HS-SCCH order. The information indicating the power offset may comprise a power offset value or an adjustment of a power offset value. The user equipment 10 may receive directly from the base station 12 an explicit indication of an increase or decrease of the power offset at the user equipment 10. The information may be a value of at least ten values for handling power imbalances between different base stations.

Action 902. The user equipment 10 transmits the HS-DPCCH signal using a power, which power is based on the information indicating the power offset.

Action 903. In some embodiments the user equipment 10 transmits, to one e.g. the base station 12, or more base stations, a specific codeword to acknowledge reception of the information.

Some embodiments herein relate to a method, performed by a UE, of improving the quality of HS-DPCCH signals transmitted from the user equipment to a plurality of NodeBs, comprising: transmitting a HS-DPCCH signal to two or more NodeBs; receiving from a NodeB an L1 message generated at the NodeB, the L1 message including a command to adjust an HS-DPCCH power offset; and adjusting the HS-DPCCH power offset in response to the received L1 message. The command to adjust an HS-DPCCH power offset may comprise an amount to adjust a current HS-DPCCH power offset. The command to adjust an HS-DPCCH power offset may comprise a HS-DPCCH power offset value to which to set the user equipment HS-DPCCH power offset.

Figure 10:
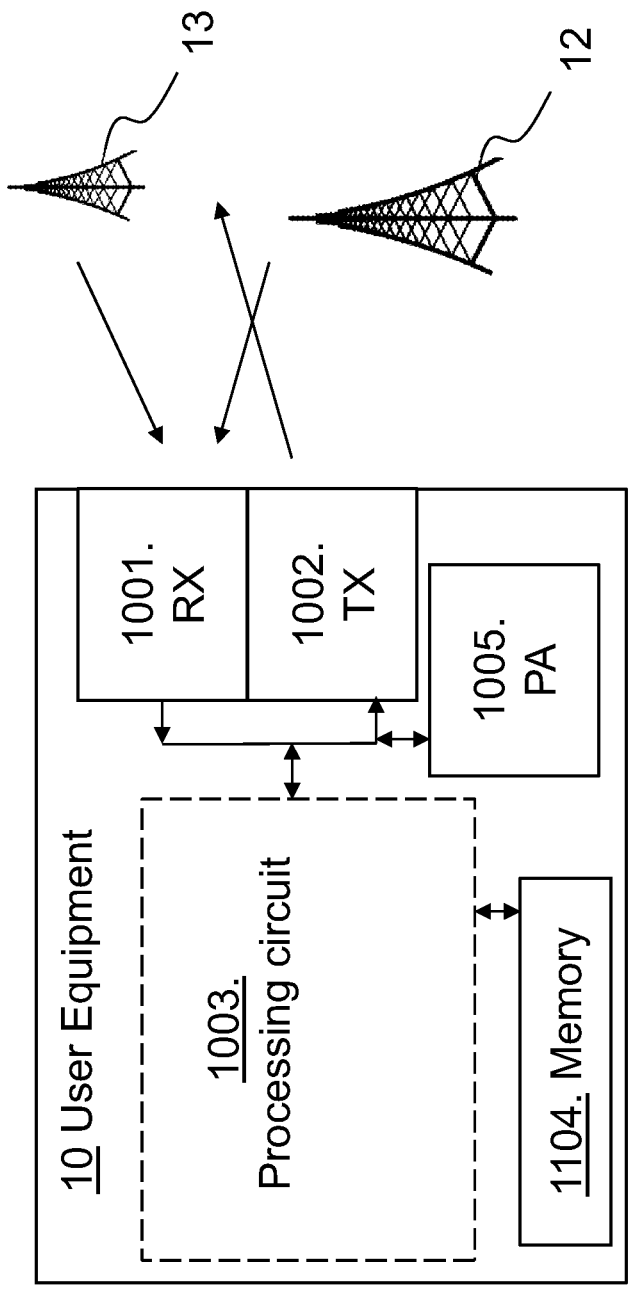
FIG. 10 is a block diagram depicting a user equipment according to embodiments herein.

FIG. 10 shows a block diagram depicting the user equipment 10 for transmitting the HS-DPCCH signal to one or more base stations.

The user equipment 10 comprises a receiver 1001 configured to receive from a base station 12 information indicating a power offset. The information is generated at the base station 12. The power offset is to be used for a HS-DPCCH transmission from the user equipment 10. The information may be comprised in a L1 message. For example, the information may be comprised in an HS-SCCH order. The information may indicate the power offset by comprising a power offset value, i.e. a factual offset value, or an adjustment of a power offset value, i.e. a delta value. The value may be an index value in a table indicating factual power offset or adjustment value. In some embodiments, the receiver 1001 may further be configured to receive directly from the base station 12 an explicit indication of an increase or decrease of the power offset at the user equipment 10.

The user equipment 10 further comprises a transmitter 1002 configured to transmit a HS-DPCCH signal using a power, which power is based on the information indicating the power offset. In some embodiments, the receiver 1001 is further configured to receive a first downlink transmission from the base station 12 and a second downlink transmission from the second base station 13, and the HS-DPCCH signal indicates feedback of the received downlink transmissions. By receiving more than nine values as previously the user equipment 10 may adjust its' transmit power more efficiently during imbalances scenarios where the base stations have different transmit powers. The transmitter 1001 may further be configured to transmit, to one or more base stations, a specific codeword to acknowledge reception of the information. Thus, all the base stations knows that the user equipment 10 has adjusted its transmit power. In some embodiments the user equipment 10 is receiving data transmissions from the base stations 12,13 according to MF-HSDPA.

The embodiments herein for transmitting the HS-DPCCH signal to one or more base stations may be implemented through one or more processors, such as a processing circuit 1003 in the user equipment 10 depicted in FIG. 10, together with computer program code for performing the functions and/or method steps of the embodiments herein. The program code mentioned above may also be provided as a computer program product, for instance in the form of a data carrier carrying computer program code for performing embodiments herein when being loaded into the user equipment 10. One such carrier may be in the form of a CD ROM disc. It is however feasible with other data carriers such as a memory stick. The computer program code may furthermore be provided as pure program code on a server and downloaded to the user equipment 10.

Furthermore, the user equipment 10 comprises a memory 1004 that may be configured to be used to store data on such as transmit power, thresholds, quality estimates, power offsets, index table of power offsets, application to perform the methods herein when being executed on the user equipment 10, and/or similar. The memory 1004 may comprise one or more memory units. It should also be understood that the user equipment 10 may further comprise a Power Amplifier (PA) 1005 configured to feed the transmissions from the user equipment 10.

Embodiments herein relate to a user equipment operative to transmit HS-DPCCH signals to a plurality of NodeBs. The user equipment comprises a transceiver, such as the receiver 1001 and the transmitter 1002, operative to receive L1 signaling from a Node B and further operative to transmit HS-DPCCH signals to two or more NodeBs. The user equipment may further comprise a controller, such as the processing circuit 1003, operative to cause the transceiver adjust an HS-DPCCH power offset in response to a received L1 message including a HS-DPCCH power offset adjustment command. The HS-DPCCH power offset adjustment command may include an amount to adjust a current HS-DPCCH power offset. The HS-DPCCH power offset adjustment command may include a HS-DPCCH power offset value to which to set the user equipment HS-DPCCH power offset.

Figure 11:
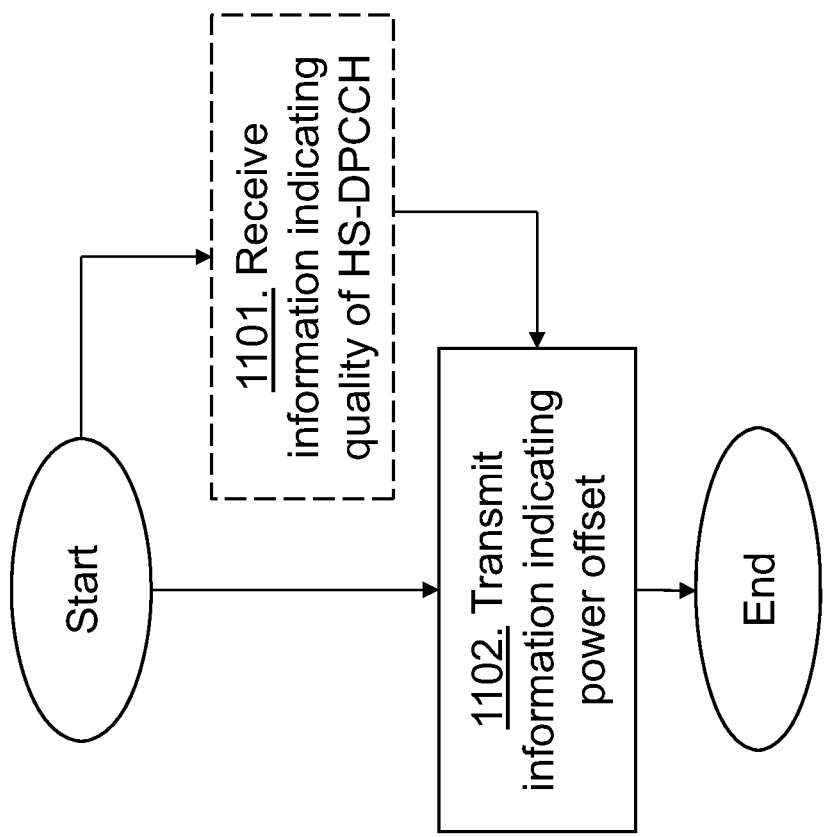
FIG. 11 is a flow diagram depicting a method in a radio network controller according to embodiments herein.

The method actions in the radio network controller 15 for informing a user equipment 10 of a power offset to be used at the user equipment 10, the user equipment 10 is in a Soft Hand-Over region between base stations 12,13 of different transmit power, and the radio network controller 15 controls the base stations 12,13, according to some general embodiments will now be described with reference to a flowchart depicted in FIG. 11. The actions do not have to be taken in the order stated below, but may be taken in any suitable order. Actions performed in some embodiments are marked with dashed boxes. The user equipment 10 may be receiving data transmissions from the base stations according to multi flow high speed data packet access, MF-HSDPA.

Action 1101. The radio network controller 15 may receive from the radio base station 12 and/or the second radio base station 13 information indicating quality of a HS-DCCH for the user equipment 10.

Figure 12:
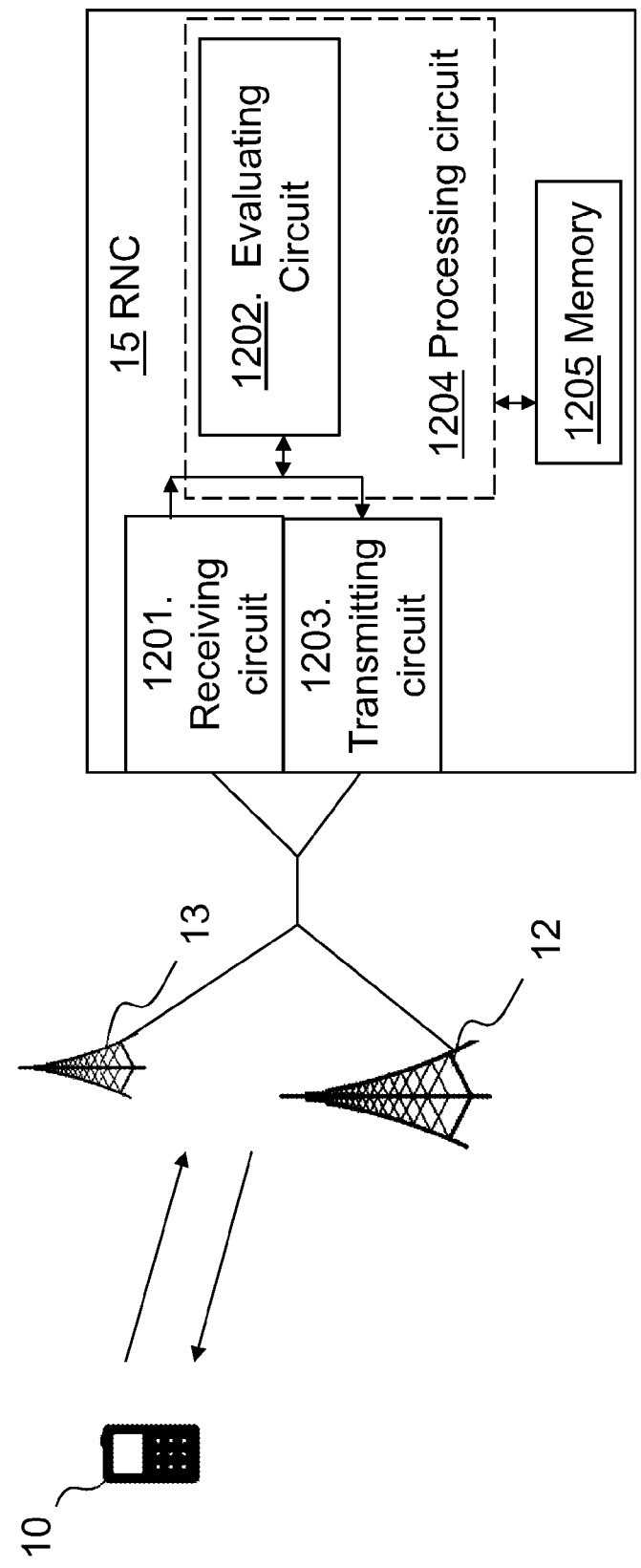
FIG. 12 is a block diagram depicting radio network controller according to embodiments herein.

Action 1102. The radio network controller 15 transmits a value indicating a power offset, which value is one of at least ten values for handling power imbalances between the base stations 12,13. For example, the base station 12 may be a macro base station and the second base station may be a micro base station FIG. 12 is a block diagram depicting the radio network controller 15 for informing a user equipment 10 of a power offset to be used at the user equipment 10, the user equipment 10 is in a Soft Hand-Over region between base stations 12,13 of different transmit power. The radio network controller 15 is configured to control the base stations 12,13.

The radio network controller 15 comprises a receiving circuit 1201 that may be configured to receive, from any of the base stations, information indicating quality of the HS-DCCH for the user equipment 10.

The radio network controller 15 may in some embodiments comprise an evaluating circuit 1202 configured to evaluate the information indicating the quality of the HS-DCCH.

The radio network controller 15 comprises a transmitting circuit 1203 configured to transmit a value indicating a power offset, which value is one of at least ten values for handling power imbalances between the base stations 12,13. In some embodiments the user equipment 10 is receiving data transmissions from the base stations according to multi flow high speed data packet access, MF-HSDPA.

The embodiments herein for informing the user equipment 10 of a power offset to be used at the user equipment 10 in a Soft Hand-Over region between base stations 12,13 of different transmit power may be implemented through one or more processors, such as a processing circuit 1204 in the radio network controller 15 depicted in FIG. 12, together with computer program code for performing the functions and/or method steps of the embodiments herein. The program code mentioned above may also be provided as a computer program product, for instance in the form of a data carrier carrying computer program code for performing embodiments herein when being loaded into the radio network controller 15. One such carrier may be in the form of a CD ROM disc. It is however feasible with other data carriers such as a memory stick. The computer program code may furthermore be provided as pure program code on a server and downloaded to the radio network controller 15.

Furthermore, the radio network controller 15 comprises a memory 1205 that may be configured to be used to store data on such as transmit power, thresholds, quality estimates, power offsets, index table of power offsets, application to perform the methods herein when being executed on the radio network controller 15, and/or similar. The memory 1205 may comprise one or more memory units Those skilled in the art will also appreciate that the various "circuits" described herein may refer to a combination of analogue and digital circuits, and/or one or more processors configured with software and/or firmware, e.g., stored in memory, that, when executed by the one or more processors, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Embodiments herein may, of course, be carried out in other ways than those specifically set forth herein without departing from essential characteristics of the claimed solution. The present embodiments are to be considered in all respects as illustrative and not restrictive, and all changes coming within the meaning and equivalency range of the appended claims are intended to be embraced therein.

The invention claimed is:

1. A method, performed in a base station, of informing a user equipment (UE) of a power offset to be used at the UE, wherein the base station is controlled by a radio network controller, the method comprising:
  receiving from a radio network controller, power offset values related to large imbalances between base stations;
  transmitting the power offset values to the UE;
  evaluating a quality of a High Speed Dedicated Physical Control Channel (HS-DPCCH) from the user equipment; and
  transmitting to the UE information, generated at the base station, which indicates the power offset, selected from the power offset values and based on the evaluation, the power offset to be used for a HS-DPCCH transmission from the UE.

2. A method according to claim 1, wherein the information is included in a layer one (L1) message.

3. A method according to claim 1, wherein the information is included in a High Speed Shared Control Channel (HS-SCCH) order.

4. A method according to claim 1, wherein the information indicating the power offset comprises one of a power offset value and an adjustment of a power offset value.

5. A method according to claim 1, wherein transmitting to the UE comprises transmitting directly to the UE an increase or decrease of the power offset at the UE.

6. A method according to claim 1, further comprising receiving a HS-DPCCH signal from the UE.

7. A method according to claim 1, wherein evaluating the quality of the HS-DPCCH comprises comparing an evaluated quality of the HS-DPCCH to a first or a second threshold of HS-DPCCH quality.

8. A method, performed in a user equipment (UE), of transmitting a High Speed-Dedicated Physical Control Channel (HS-DPCCH) signal to one or more base stations, comprising:

receiving from a radio network controller, via a base station, power offset values related to large imbalances between base stations;

receiving from the base station information, generated at the base station, indicating a power offset selected from the power offset values, wherein the power offset is to be used for the HS-DPCCH transmission from the UE; and transmitting the HS-DPCCH signal using a power that is based on the information indicating the power offset.

9. A method according to claim 8, wherein the information is included in a Layer one (L1) message.

10. A method according to claim 8, wherein the information is included in a High Speed Shared Control Channel (HS-SCCH) order.

11. A method according to claim 8, wherein the information indicating the power offset comprises one of a power offset value and an adjustment of a power offset value.

12. A method according to claim 8, wherein receiving the information generated at the base station comprises receiving directly from the base station an explicit indication of an increase or decrease of the power offset at the user equipment.

13. A method according to claim 8, further comprising receiving a first downlink transmission from the base station and a second downlink transmission from a second base station, and wherein the HS-DPCCH signal indicates feedback of the received downlink transmissions.

14. A method according to claim 8, further comprising transmitting, to the one or more base stations, a specific codeword to acknowledge reception of the information.

15. A base station configured to inform a user equipment (UE) of a power offset to be used at the UE, wherein the base station is configured to be controlled by a radio network controller, comprising a receiving circuit configured to receive from a radio network controller power offset values to handle large imbalances between base stations;

a transmitter configured to transmit the power offset values to the user equipment;

an evaluating circuit configured to evaluate a quality of a High Speed Dedicated Physical Control Channel (HS-DPCCH), from the UE; and the transmitter being further configured to transmit to the UE information, generated at the base station, indicating a power offset selected from the power offset values, wherein the power offset is based on the evaluation and is to be used for a HS-DPCCH transmission from the user equipment.

16. A base station according to claim 15, wherein the information is included in a layer one (L1) message.

17. A base station according to claim 15, wherein the information is included in a High Speed Shared Control Channel (HS-SCCH) order.

18. A base station according to claim 15, wherein the information indicating the power offset comprises one of a power offset value and an adjustment of a power offset value.

19. A base station according to claim 15, wherein the transmitter is configured to transmit directly to the UE an increase or decrease of the power offset at the UE.

20. A base station according to claim 15, wherein the evaluating circuit is configured to compare an evaluated quality of the HS-DPCCH to a first or a second threshold of HS-DPCCH quality.

21. A base station according to claim 15, further comprising a receiver configured to receive a HS-DPCCH signal from the UE.

22. A user equipment (UE) configured to transmit a High Speed-Dedicated Physical Control Channel (HS-DPCCH) signal to one or more base stations, comprising:

a receiver configured to receive from a radio network controller via a base station, power offset values to handle large imbalances between base stations, and to receive, from a base station, information generated at the base station and indicating a power offset, selected from the power offset values, wherein the power offset is to be used for a HS-DPCCH transmission from the UE; and a transmitter configured to transmit the HS-DPCCH signal using a power, wherein the power is based on the information indicating the power offset.

23. A UE according to claim 22, wherein the information is included in a Layer one (L1) message.

24. A UE according to claim 22, wherein the information is included in a High Speed Shared Control Channel (HS-SCCH) order.

25. A UE according to claim 22, wherein the information indicating the power offset comprises one of a power offset value and an adjustment of a power offset value.

26. A UE according to claim 22, wherein the receiver is further configured to receive directly from the base station an explicit indication of an increase or decrease of the power offset at the user equipment.

27. A UE according to claim 22, wherein the receiver is further configured to receive a first downlink transmission from the base station and a second downlink transmission from a second base station, and wherein the HS-DPCCH signal indicates feedback of the received downlink transmissions.

28. A UE according to claim 22, wherein the transmitter is further configured to transmit to the one or more base stations a specific codeword to acknowledge reception of the information.

* * * * *